United States Patent [19]

Shell

[11] 3,970,464

[45] July 20, 1976

[54] SILICA-FREE, ALKALI METAL-FREE AND LEAD-FREE SEALING GLASSES

[75] Inventor: James Allen Shell, Toledo, Ohio

[73] Assignee: Owens-Illinois, Inc., Toledo, Ohio

[22] Filed: Feb. 10, 1975

[21] Appl. No.: 548,265

[52] U.S. Cl. ............................................. 106/47 R
[51] Int. Cl.² ..................... C03C 3/14; C03C 3/12; C03C 3/30
[58] Field of Search ................................... 106/47 R

[56] References Cited
UNITED STATES PATENTS

| | | | |
|---|---|---|---|
| 2,254,633 | 9/1941 | Tillyer | 106/47 R |
| 2,434,281 | 1/1948 | Moulton | 106/47 R |
| 2,477,649 | 8/1949 | Pincus | 106/47 R |
| 3,300,670 | 1/1967 | Veres | 106/47 R |

*Primary Examiner*—Winston A. Douglas
*Assistant Examiner*—Mark Bell
*Attorney, Agent, or Firm*—Richard B. Dence; E. J. Holler

[57] ABSTRACT

Zinc borate sealing glasses free of silica, alkali metal oxide and lead are disclosed for use in sealing and encapsulation, particularly in connection with semiconductor devices and electronic components which are sensitive to alkali metal and lead. The glasses have coefficients of thermal expansion in the range of about 35 to 55 × $10^{-7}$/°C, fiber softening temperatures in the range of about 600° to 675°C and annealing point temperatures in the range of about 500 to 580°C.

12 Claims, No Drawings

SILICA-FREE, ALKALI METAL-FREE AND LEAD-FREE SEALING GLASSES

The present invention relates to glass compositions having desirable thermal expansion characteristics, good viscosity properties and good chemical durability, and which are particularly suitable for use as sealing glasses for a wide variety of purposes and more especially for sealing together glass to metal parts or for sealing metal parts together or for the encapsulation of semi-conductor devices.

It is widely known that solid state electronic devices may be susceptible to damage or other adverse effects caused by the presence of certain materials in the sealing glasses used in sealing or encapsulating the solid state electronic devices. Generally, it is also desirable to provide glass compositions that are capable of being drawn into various glass articles as well as for sealing purposes so that the glass can be more widely used for sealing, packaging and encapsulating electrical parts and equipment and the like.

Various compositions have been used in the past which have been satisfactory for the production of small glass containers but have possessed poor properties for sealing purposes and moreover have deleteriously affected certain delicate materials which have been packaged or sealed therein. Illustrative of such deleterious effects is the "poisoning" effect which glasses containing alkali metal oxides such as potassium and sodium have on certain electronic parts thereby prohibiting the use of such glasses for packaging and/or sealing these articles. The electrical characteristics of solid state electronic devices readily undergo change in response to migration of mobile ions, particularly the alkali metal ions. The movement of such ions typically causes a drift of electrical characteristics, particularly when they collect on the most critical areas of functional surfaces as they do in semi-conductor diodes and transistors. In other structures where the glass is spaced somewhat away from the critical surfaces, these critical surfaces may become contaminated by the volatilization of the alkali at the time of sealing. The functional surfaces of the various current controlling components must be effectively protected against depreciation of electrical properties by such ions in order to assure reasonable reliability and operating life of the devices.

In sealing various surfaces, it is important that the glass compositions resist devitrification in the course of sealing and during subsequent treatments of the sealed metal part. Furthermore, when the metal has been sealed it is necessary that the glass should resist chemical attack which may occur from exposure to the atmosphere or exposure to other environments.

In addition, it is necessary that the glass have good stability and to assure that a good seal is obtained. It is also important that the sealing glass possess a coefficient of thermal expansion that approximates as closely as possible that of the metal to which it is sealed. If the rate of thermal expansion is significantly different, a satisfactory bond may not be maintained upon cooling the seal when first made and the bond between the glass and the metal, if initially satisfactory, can fail later as a result of temperature fluctuations. The glass must provide physical or mechanical isolation and be free of contaminating ions and other materials which can migrate to the functional surface. The glass must be workable at a temperature low enough to avoid damage to the device and have an annealing point such that there would be no chance that the electronic device could receive irreparable damage due to heat distortion.

SUMMARY OF THE INVENTION

The principal object of the invention is to provide a new and improved glass composition characterized by desirable thermal expansion characteristics, desirable physical and chemical properties, which are particularly suitable for sealing to glass and metal surfaces while avoiding the disadvantages and drawbacks of prior known compositions and methods.

Accordingly, the glasses of the present invention have softening temperatures generally lower than 675°C and in the range of about 600° to 675°C, preferably 610° to 660°C. Also these glasses have an annealing point temperature within the range of about 500° to 580°C. Being of moderate to low thermal expansion characteristics the glasses can be used for sealing to a variety of surfaces. Generally, the lineal coefficient of thermal expansion ranges from about 35 to 55 $\times$ $10^{-7}$/°C and more especially within the range of 40 to 50 $\times$ $10^{-7}$/°C. The glasses of the invention are described in terms of the following components based on the total oxide composition in the indicated weight percent amount:

| Component | Weight Percent |
|---|---|
| ZnO | 52.4–58.5 |
| $B_2O_3$ | 32.4–40.6 | and at least one of the following:

| | |
|---|---|
| $Al_2O_3$ | 0–6.7 |
| CaO | 0–3.7 |
| CuO | 0–5.1 |
| $GeO_2$ | 0–6.7 |
| $V_2O_5$ | 0–6 |
| MgO | 0–2.7 |

Expressed on a mole percent basis, glasses of this invention are described by the following compositional ranges:

| Component | Mole Percent |
|---|---|
| ZnO | 50–55 |
| $B_2O_3$ | 35–45 | and at least one of the following:

| | |
|---|---|
| $Al_2O_3$ | 0–5 |
| CaO | 0–5 |
| CuO | 0–5 |
| $GeO_2$ | 0–5 |
| $V_2O_5$ | 0–2.5 |
| MgO | 0–5 |

These glasses contain no alkali metal oxide, no silica and no lead, other than minor amounts which may be introduced as impurities or trace amounts present in the raw materials.

In general, the sum of ZnO + $B_2O_3$ is in the range of at least about 85% by weight, or expressed in mole percent, in an amount of at least about 80 mole percent.

DETAILED DESCRIPTION OF THE INVENTION

According to the present invention a glass composition is provided which contains no sodium or potassium oxide, contains no lead oxide and contains no silica. Many of these materials contained in prior known glass compositions have adverse effects on certain sealed metal articles. Because of their properties, the glasses of the present invention are particularly well-suited for the sealing of electronic components and semi-conductor surfaces. These glasses will be used in the fabrication of microelectronic devices. They can be used in the direct contact with the active elements of the device such as in a protective coating or sealant. The glasses have the appropriate thermal expansivity to match the other components of the micro-electric devices. These glasses can also be made with materials to have alkali lead contents less than 50 parts per million.

As set forth herein the various components are expressed in terms of oxides although in preparing the sealing glasses the components may be added in various forms. For obtaining compositions as defined herein it will be necessary to take into account losses due to volatilization and the like. Thus, the compositions of the starting batch are adjusted accordingly. For the manufacture of a sealing glass according to the present invention the batch can be prepared from the various ingredients commonly used in the art for preparing the constituent oxides in their required amounts. In order to further reduce the chances of contamination the glasses can be prepared by organo-metallic techniques, vapor phase techniques, and other procedures known in the art.

The following examples serve to illustrate the present invention but are not considered limiting thereof in any way. To facilitate the description of this invention the following examples are given both in mole and in weight percent:

EXAMPLE I

| Component | Weight Percent | Mole Percent |
|---|---|---|
| ZnO | 57.5 | 55 |
| $B_2O_3$ | 35.8 | 40 |
| $GeO_2$ | 6.7 | 5 |
| Coefficient of thermal expansion × $10^7$/°C(0–300°C) | | 44.7 |
| Softening Point | | 635°C |
| Annealing Point | | 565°C |

EXAMPLE II

| Component | Weight Percent | Mole Percent |
|---|---|---|
| ZnO | 52.4 | 50 |
| $Al_2O_3$ | 6.6 | 5 |
| $B_2O_3$ | 35.9 | 40 |
| CuO | 5.1 | 5 |
| Coefficient of thermal expansion × $10^7$/°C(0–300°C) | | 43.6 |
| Softening Point | | 630°C |
| Annealing Point | | 523°C |

Example III

| Component | Weight Percent | Mole Percent |
|---|---|---|
| ZnO | 55.6 | 55 |
| $Al_2O_3$ | 6.3 | 5 |
| $B_2O_3$ | 32.4 | 37.5 |
| $V_2O_5$ | 5.7 | 2.5 |
| Coefficient of thermal expansion × $10^7$/°C(0–300°C) | | 44.7 |
| Softening Point | | 645°C |
| Annealing Point | | 543°C |

EXAMPLE IV

| Component | Weight Percent | Mole Percent |
|---|---|---|
| ZnO | 53.8 | 50 |
| $Al_2O_3$ | 6.7 | 5 |
| $B_2O_3$ | 36.8 | 40 |
| MgO | 2.7 | 5 |
| Coefficient of thermal expansion × $10^7$/°C(0–300°C) | | 46.8 |
| Softening Point | | 643°C |
| Annealing Point | | 550°C |

EXAMPLE V

| Component | Weight Percent | Mole Percent |
|---|---|---|
| ZnO | 53.2 | 50 |
| $Al_2O_3$ | 6.7 | 5 |
| $B_2O_3$ | 36.4 | 40 |
| CaO | 3.7 | 5 |
| Coefficient of thermal expansion × $10^7$/°C(0–300°C) | | 47.4 |
| Softening Point | | 630°C |
| Annealing Point | | 547°C |

EXAMPLE VI

| Component | Weight Percent | Mole Percent |
|---|---|---|
| ZnO | 53.5 | 50 |
| $Al_2O_3$ | 6.7 | 5 |
| $B_2O_3$ | 36.6 | 40 |
| CaO | 1.8 | 2.5 |
| MgO | 1.3 | 2.5 |
| Coefficient of thermal expansion × $10^7$/°C(0–300°C) | | 48.2 |
| Softening Point | | 635°C |
| Annealing Point | | 550°C |

EXAMPLE VII

| Component | Weight Percent | Mole Percent |
|---|---|---|
| ZnO | 57.6 | 55 |
| $Al_2O_3$ | 6.5 | 5 |
| $B_2O_3$ | 35.8 | 40 |
| Coefficient of thermal expansion × $10^7$/°C(0–300°C) | | 45.0 |
| Softening Point | | 614°C |
| Annealing Point | | 550°C |

EXAMPLE VIII

| Component | Weight Percent | Mole Percent |
|---|---|---|
| ZnO | 52.8 | 50 |
| $Al_2O_3$ | 6.6 | 5 |
| $B_2O_3$ | 40.6 | 45 |
| Coefficient of thermal expansion × $10^7$/°C(0–300°C) | | 46.8 |
| Softening Point | | 658°C |
| Annealing Point | | 567°C |

The preferred compositional ranges of the present invention are set forth in the following table expressed in weight percent:

| Component | Weight Percent |
|---|---|
| ZnO | 52.4–57.6 |
| $B_2O_3$ | 32.4–40.6 |
| $Al_2O_3$ | 0–6.7 |
| CaO | 0–3.7 |
| CuO | 0–5.1 |
| $GeO_2$ | 0–6.7 |
| $V_2O_5$ | 0–5.7 |
| MgO | 0–2.7 |

Expressed on the basis of mole percent these preferred compositions are as follows:

| Component | Mole Percent |
|---|---|
| ZnO | 50–55 |
| B$_2$O$_3$ | 37.5–45 |
| Al$_2$O$_3$ | 0–5 |
| CaO | 0–5 |
| CuO | 0–5 |
| GeO$_2$ | 0–5 |
| V$_2$O$_5$ | 0–2.5 |
| MgO | 0–5 |

It is understood that various other modifications will be apparent to and can readily be made by those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

What is claimed is:

1. A sealing glass composition that is lead free, alkali metal free and free of silica which consists essentially of the following components in the indicated mole percent ranges based upon the total composition:

| Component | Mole Percent |
|---|---|
| ZnO | 50–55 |
| B$_2$O$_3$ | 35–45 | the total mole percent amount of ZnO and B$_2$O$_3$ being not greater than about 95 mole percent and the balance of said composition alternatively consisting of (a) about 5 mole percent of GeO$_2$, or (b) about 5 mole percent of Al$_2$O$_3$ together with at least one of the following:

| Component | Mole Percent |
|---|---|
| CaO | 0–5 |
| CuO | 0–5 |
| GeO$_2$ | 0–5 |
| V$_2$O$_5$ | 0–2.5 |
| MgO | 0–5 |

2. The sealing glass composition as set forth in claim 1 wherein the coefficient of thermal expansion ranges from 35 to 55 × 10$^{-7}$/°C over the range of 0° to 300°C.

3. The sealing glass composition as set forth in claim 1 wherein the coefficient of thermal expansion ranges from 40 to 50 × 10$^{-7}$/°C over the range of 0° to 300°C.

4. The sealing glass composition as set forth in claim 1 wherein the softening point ranges from 600° to 675°C.

5. The sealing glass composition as set forth in claim 1 wherein the softening point ranges from 610° to 660°C.

6. The sealing glass composition as set forth in claim 1 wherein the annealing point ranges from 500° to 580°C.

7. The sealing glass composition as set forth in claim 1 of the following composition:

| Component | Mole Percent |
|---|---|
| ZnO | 50 |
| Al$_2$O$_3$ | 5 |
| B$_2$O$_3$ | 40 |
| CuO | 5. |

8. The sealing glass composition as set forth in claim 1 of the following composition:

| Component | Mole Percent |
|---|---|
| ZnO | 55 |
| Al$_2$O$_3$ | 5 |
| B$_2$O$_3$ | 37.5 |
| V$_2$O$_5$ | 2.5. |

9. The sealing glass composition as set forth in claim 1 of the following composition:

| Component | Mole Percent |
|---|---|
| ZnO | 50 |
| Al$_2$O$_3$ | 5 |
| B$_2$O$_3$ | 40 |
| MgO | 5. |

10. The sealing glass composition as set forth in claim 1 of the following composition:

| Component | Mole Percent |
|---|---|
| ZnO | 50 |
| Al$_2$O$_3$ | 5 |
| B$_2$O$_3$ | 40 |
| CaO | 5. |

11. The sealing glass composition as set forth in claim 1 of the following composition:

| Component | Mole Percent |
|---|---|
| ZnO | 50 |
| Al$_2$O$_3$ | 5 |
| B$_2$O$_3$ | 40 |
| CaO | 2.5 |
| MgO | 2.5. |

12. A sealing glass composition that is lead free, alkali metal free and free of silica which consists essentially of the following components in the indicated mole percent ranges based upon the total composition:

| Component | Mole Percent |
|---|---|
| ZnO | 55 |
| B$_2$O$_3$ | 40 |
| GeO$_2$ | 5. |

* * * * *